United States Patent [19]

Hannum et al.

[11] 4,066,489
[45] Jan. 3, 1978

[54] METHOD FOR MAKING ANNULAR ARTICLES

[75] Inventors: Joseph R. Hannum, Norristown; Gerard R. Santos, Levittown, both of Pa.

[73] Assignee: The Budd Company, Troy, Mich.

[21] Appl. No.: 683,565

[22] Filed: May 5, 1976

[51] Int. Cl.[2] .......................... B32B 1/08; B32B 27/42
[52] U.S. Cl. ............................................ 156/258; 83/46; 156/266; 156/304; 156/512
[58] Field of Search .............. 29/412, 415, 416, 159.2, 29/159 R; 83/42, 43, 46, 49, 50; 74/445; 156/258, 264, 265, 266, 273, 304, 159

[56] References Cited

U.S. PATENT DOCUMENTS

| 935,826 | 10/1909 | Taylor | 83/46 |
|---|---|---|---|
| 1,315,896 | 9/1919 | Wright | 74/445 |
| 1,334,149 | 3/1920 | Frank | 83/43 |
| 1,501,028 | 7/1924 | Guay | 156/266 |
| 1,504,596 | 8/1924 | Bastian | 74/445 |
| 1,561,222 | 11/1925 | Frederick | 74/445 |
| 1,891,823 | 12/1932 | Lytle | 74/445 |
| 1,945,415 | 1/1934 | Benge | 74/445 |
| 2,050,916 | 8/1936 | Benge et al. | 74/445 |
| 2,343,253 | 3/1944 | Clark | 29/415 |
| 3,345,226 | 10/1967 | Frenkel et al. | 156/273 |

*Primary Examiner*—William A. Powell
*Assistant Examiner*—Thomas Bokan

[57] ABSTRACT

This application discloses method and means for making annular articles, such as rims, particularly rims which form components of gear wheels, in which arcuate segments are cut from a parallel-sided strip, ribbon, or tape without any waste of material and assembled to form an annulus without voids between segments; also means for cutting segments from a tape and coincidently placing them accurately in an annular assembly container or bucket and then integrating them to form an annular article which can be handled as a unit for assembling with other components to form a finished product.

13 Claims, 9 Drawing Figures

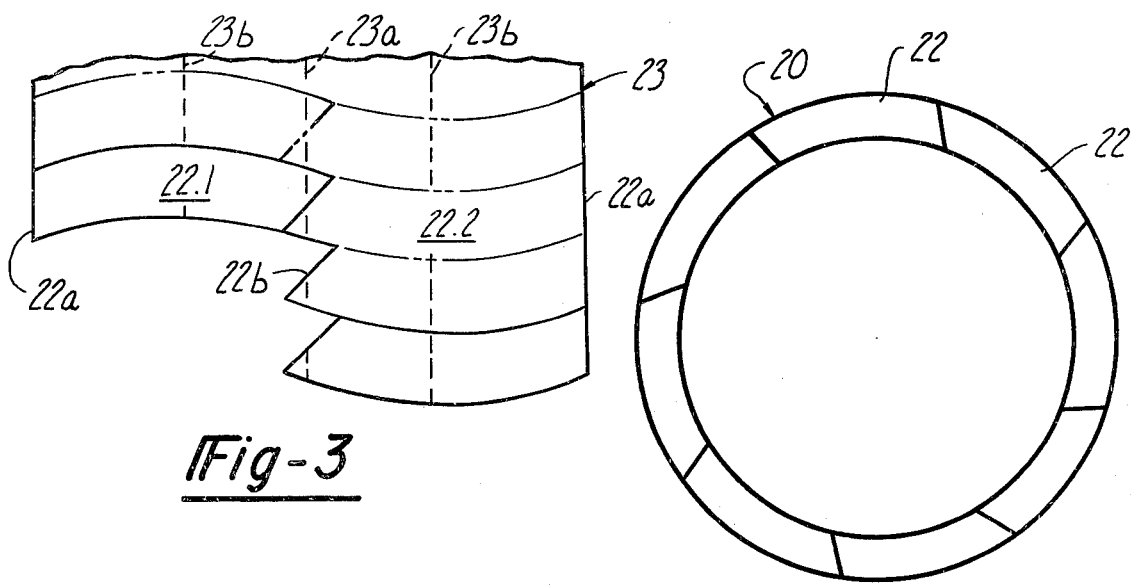
Fig-3
Fig-2
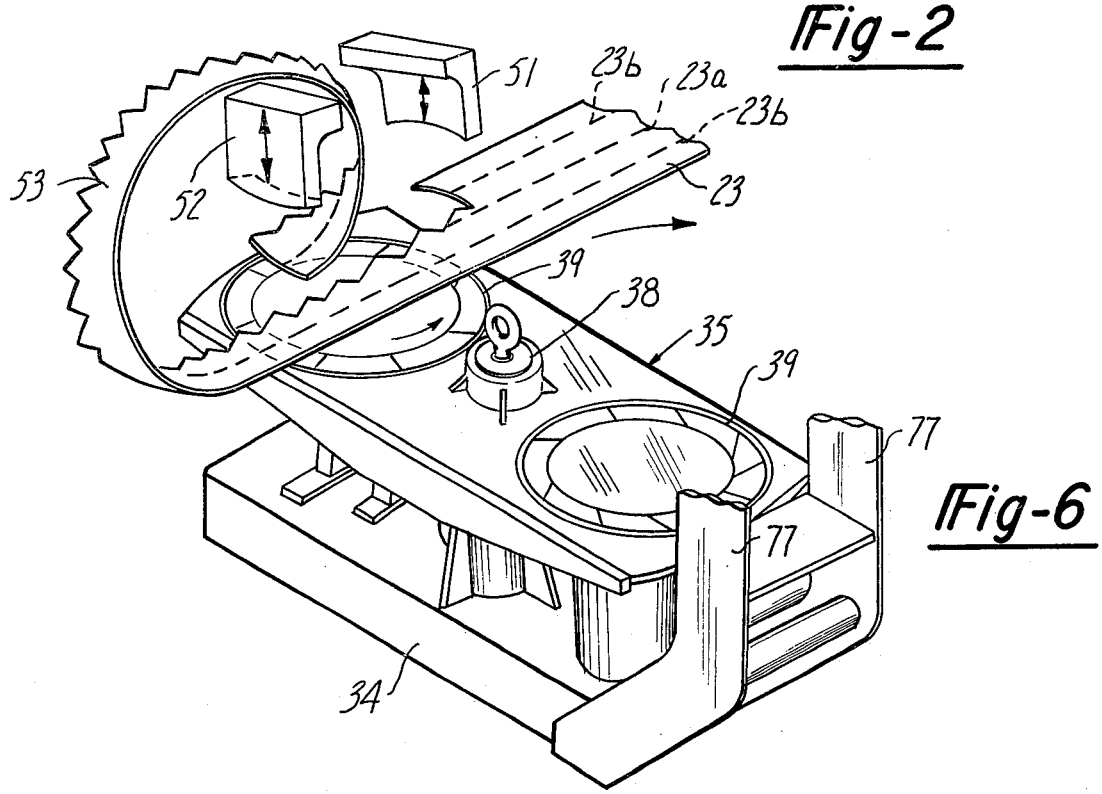
Fig-6

METHOD FOR MAKING ANNULAR ARTICLES

BACKGROUND

For a long time it has been a practice to form annular articles, such as rims for steering wheels, gears, and the like, of laminations of a non-flowable strength-giving base material and a flowable hardenable bonding material. Where great strength is not a material consideration, paper has been used as the base material; where greater strength is desired, woven fabric or other strong materials have been used as the base material. Conveniently, it has been usual to impregnate the base material with the bonding material before the laminating elements are formed, as by die-cutting. A bonding material now commonly used, when the parts need to be hard, rigid, and serviceable, is a phenolic condensation product.

An important consideration in producing laminated annular articles is to produce laminae blanks from sheet material and to do so with the minimum amount of scrap, sometimes referred to as drop off. The most convenient form of sheet to use in production is a strip, ribbon or tape taken from a large roll.

U.S. Pat. No. 1,315,896, Sept. 9, 1919, offers one example of a proposal to conserve sheet material when cutting lamination elements or blank segments for making gear annuli to avoid having to cut complete annuli from a sheet, the segment ends being cut on radii of the annulus to be formed; but it can be seen that with this proposal the percentage of scrap is very great as compared with the useful segmental blanks produced.

U.S. Pat. No. 935,826, Oct. 5, 1909, offers another example of a proposal to get the maximum number of blanks from a strip of material fed off a roll; but here, again, the percentage of scrap is very considerable. Incidently the blanks are used for forming frusto-conical cups and the situation is not closely comparable to the production of blanks to form laminae of annular particles.

The next major consideration is to form the annulus of laminations but without voids in the base material. This, of course, is possible by forming the blanks with ends matching radii of the annular article to be made, as in the patent referred to above; but obviously, this entails much scrap loss from the sheet, especially if it is desired that the blanks be cut from a strip or tape with parallel sides and conveniently fairly narrow, as supplied from a roll for rapid production. When an article with voids in the base material is finished under heat and pressure the bonding material will flow into and fill the voids but the void fillings will have less strength than if the base material had been present, and this is particularly objectionable where gear teeth are cut in the periphery and the greatest possible homogeneity and strength are desired.

Another consideration is the manner in which blank segments are deposited in an annular container form, bucket, or cup in the lay-up stage. They must be disposed flatwise, evenly and preferably end-abutting when segmental blanks are used. This and the factor of desired speed practically eliminate consideration of preforming and hand-layup. Hence, there is a preference for cutting and depositing blanks directly into the assembly container. And since any scrap formed is likely to fall into a container to produce inferior and possibly discardable articles, any scrap or trimming at this stage is undesirable.

As to apparatus, one prior practice has been to bring a plurality of sheets from rolls into stacked relationship at a press; punch out arcuate laminar segments of practically full strip width into an annular rotatable bucket against an annular spring-supported bottom ring, the segments being placed end-to-end in each layer and end-staggered like brickwork in adjacent layers; bringing a clamp ring down on a completed annular blank and clamping it to the bottom ring; then removing the clamped blanks to an oven and consolidating them by heat. The clamps are re-used in taking other blanks from the buckets, the bottom rings being put back in the buckets. The forming machine has a plurality of rotatable buckets which are brought successively into blank-punching position for filling. The punch-die unit cuts an arcuate segment on both ends and on at least one arcuate side so there is drop-off which is blown away. The drop-off is used, if possible, for inferior parts which can use small-sized material; if not, it is lost as scrap. And since the material is quite expensive it is desirable to minimize or eliminate drop-off or scrap. Also it is desirable to avoid or minimize hand operations involved in this prior practice.

SYNOPSIS OF THE INVENTION

It would be possible to extend the discussion of what are considered to be shortcomings of the prior art practices as related to the aims of the present invention but it is believed that enough has been shown to indicate that the objects of the present invention include: the minimization or elimination of scrap formation when producing blank segments from strip, ribbon, or tape fed from rolls; the minimization or elimination of voids in the base material in the lay-up and non-homogeneity and weakness in the product; the formation and deposit of blank segments by machinery to eliminate hand operations for speed and precision; the formation and deposit of a plurality of blank segments simultaneously; the consolidation of the laminae while still held securely in proper shape to form a coherent body which can be handled for further operations; and the provision of apparatus which is convenient, efficient, dependable and rapid in operation and which can be used for producing annular blanks of different sizes.

DRAWINGS

The objects of the invention, as well as various features of novelty and advantages, will be apparent from the following description of an illustrative embodiment, reference being made to the accompanying drawings thereof, wherein:

FIG. 2 is an enlarged plan view of the annular blank shown in FIG. 1;

FIG. 3 is an enlarged plan view of a ribbon, strip, or tape showing how laminae blank segments are cut from it;

FIG. 6 is a top perspective view of the rudiments of a machine for forming coherent laminated annular blanks;

SPECIFIC EMBODIMENT

It is believed that it would be more confusing than enlightening to fully disclose all the machinery and controls which have been used to cut blank segments and form them into a coherent blank annulus for further use in forming a toothed gear. The gear presently produced is an engine timing gear. What is deemed important is to clearly disclose how blank segments are formed from a strip or tape of material fed off a roll; how the blank segments are shaped to avoid all scrap, yet provide segments with angular ends which fit perfectly with the ends formed at the straight sides of the strip from which they are cut, leaving no voids if segments are placed end-to-end and providing inclined rather than radial ends; how a plurality of blanks are formed and deposited simultaneously and precisely; how a lay-up blank annulus is compressed and heated to make a coherent unit; and, incidentally, how a wide tape can be folded to provide a thicker tape for speeding lay-up operations and to assist position indexing for cutting.

Figure 1:
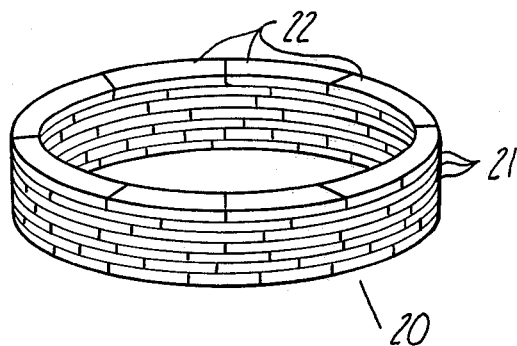
FIG. 1 is a top perspective view of an assembled laminated annular blank formed by a lay-up of blank segments according to the invention, the laminae being shown in exaggerated thickness for clarity.

First, attention is directed to FIGS. 1 and 2 which show an annular blank 20 formed of a plurality of laminae 21 with the laminae composed of blank segments 22. As stated above, the laminae have been shown of exaggerated thickness for clarity.

Figure 5:
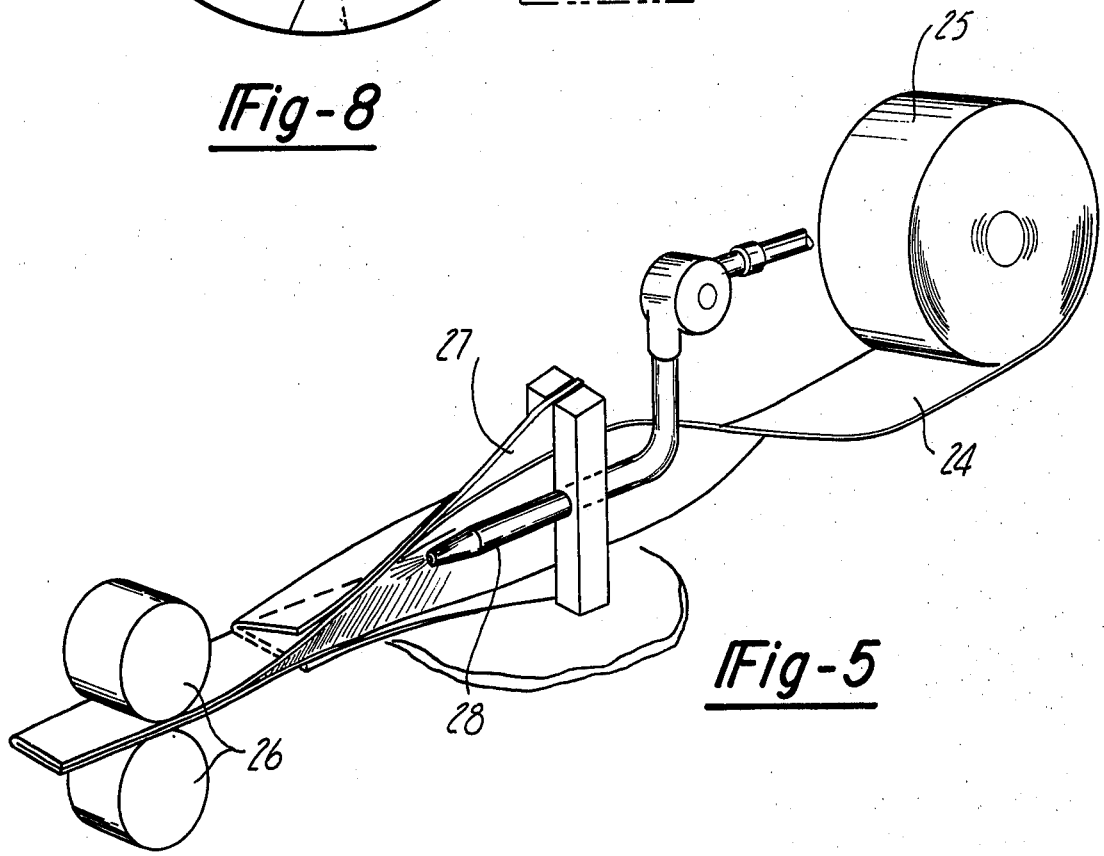
FIG. 5 is a perspective view showing a wide strip or tape being fed from a roll, heated and folded.

To anticipate briefly, FIG. 5, let it be assumed that the blank segments are cut from a folded strip or tape 23, say 4 inches wide, formed from a double-width tape 24, 8 inches wide, taken off a roll of material 25, as by feed and squeeze rolls 26, folding means 27 and heated air supply means 28 being employed for folding the strip and causing the bonding material, uncured phenolic say, to bind the lapped layers together.

Very thick tape formed of many layers of material is not easy to cut, especially where precision of shape is desired but limited thicknesses can be handled and, as stated, the increased thickness aids the speed of lay-up. If desired, the doubled strips of material may be wound on rolls and stored for future use. For simplicity of illustration, a doubled strip 23 is shown in the apparatus views.

Figure 4:
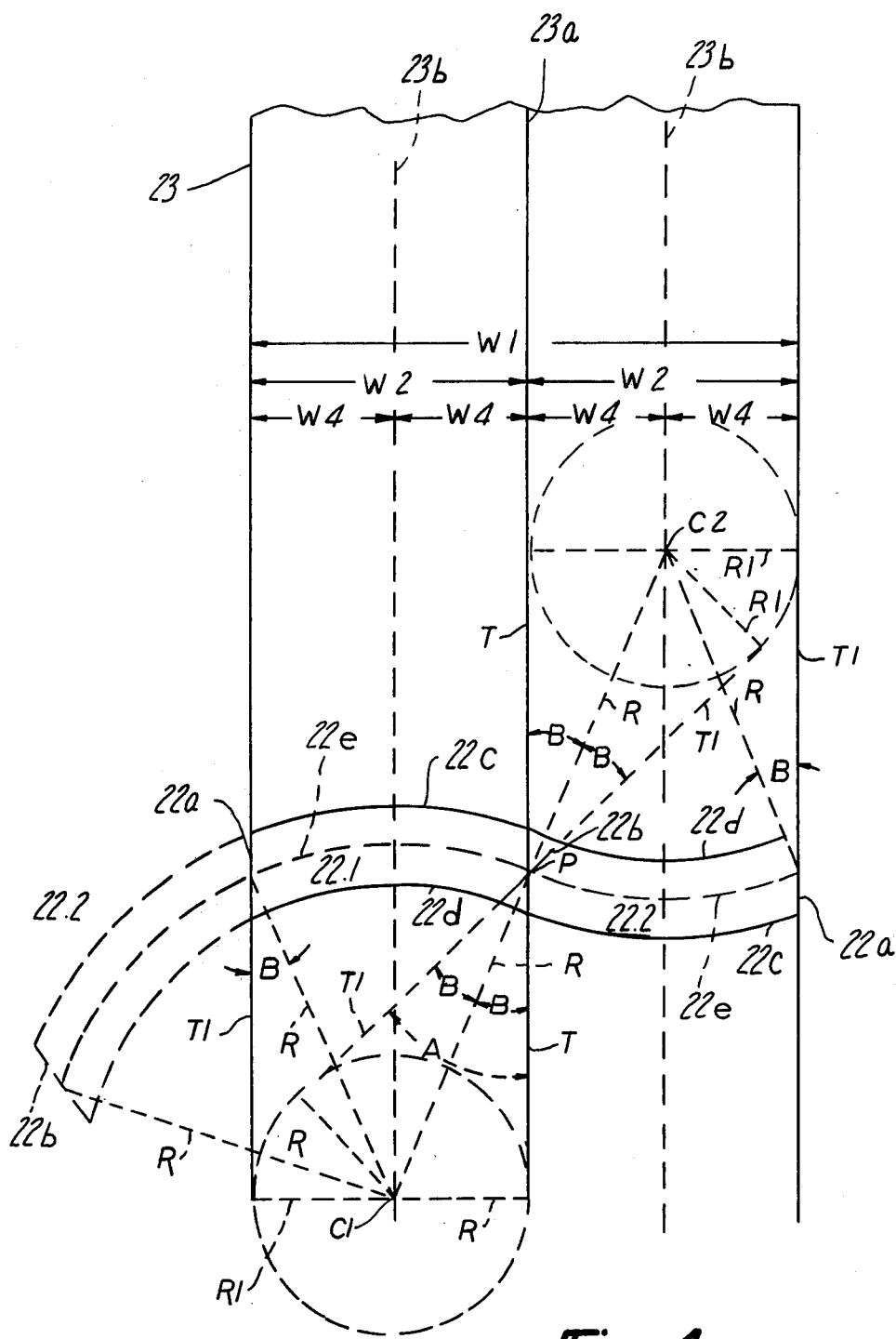
FIG. 4 is a plan view of a tape showing how blank segments are formed therefrom, together with an analysis of how the shape is derived.
Figure 7:
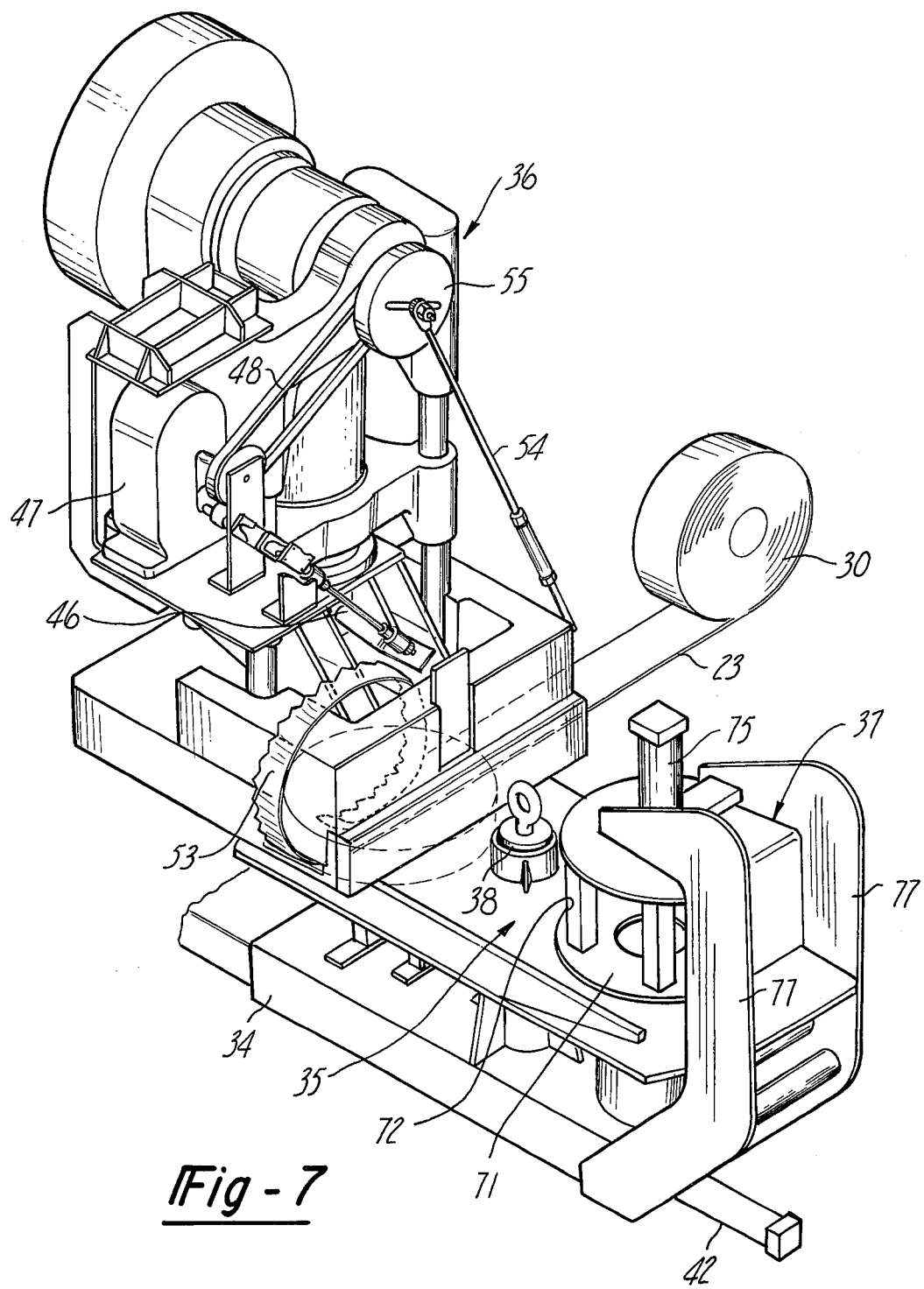
FIG. 7 is a perspective view showing more of the parts of the machine shown in FIG. 6.
Figure 9:
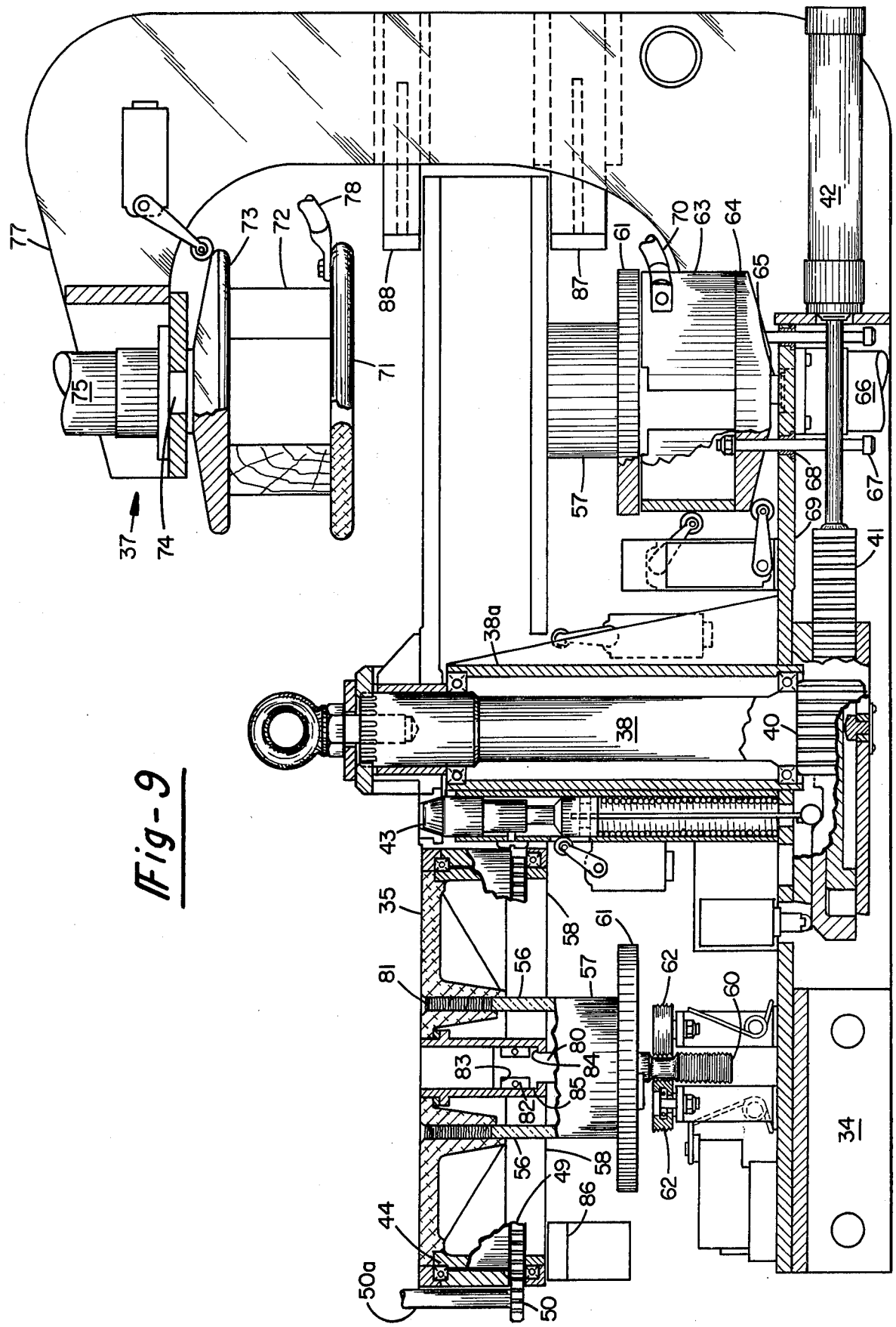
FIG. 9 is a vertical longitudinal sectional view through a turntable and some associated mechanisms forming part of the machine.

FIGS. 3 and 4 show how the blank segments are formed from a strip of material 23. Although the segments are identical they are reversely arranged across the sheet or strip or tape. No emphasis is placed on a mere reverse layout arrangement since this has previously been used in other ways and for other purposes. What is to be noted here is that two blank segments are formed reversely across the tape; that they fit perfectly end-to-end if placed in end-abutting relationship in an annular form; and that there is no scrap left from the tape.

The blank segments shown on the left of the tape center line 23a are upwardly convex and are designated as 22.1; those on right side of the center line 23a are upwardly concave and are designated as 22.1. The outer ends 22a of the segments are uncut hence their disposition is determined by the sides of the tape; the inner ends 22b, in annular assembly, are complementary to the edges 22a so as to fill all the space and leave no voids in base material. The ends 22b are inclined in a manner dependent on the width of the strip, the O.D. (outside diameter) of the annulus to be formed, and the width of the annulus, that is, the difference between the O.D. and the I.D. (inside diameter).

The generation of these blank segment shapes is shown in FIG. 4. Say the width W of the strip or tape is 4 inches, the blank segment 22.1 will be largely produced from the material on the left of the center line 23a of the strip and the segment 22.2 largely from the material on the right of the center line 23a. The blank segments divide on the center line 22b (end cutting line), which crosses the tape center line 23a at the point P where it crosses the center line arcs of the mid-width of the segments.

The geometry is established by the known fact that if two pieces like these are to be identical after cutting from a tape in reversed position, the line of separation or cutting line must cross the center line of the tape strip and the arcuate center line of the segments. Looked at another way, the arcuate center lines of the segments are of equal length.

The arcuate shape and width of the segments, of course, is determined by the O.D. and I.D. of the annular article to be formed. The arcs of the segments are drawn from the centers C1 and C2 on the mid-width lines 23b of the halves lying on the sides of the full tape center line 23a. The full width has been designated as W, so the half width will be W/2 and the quarter width W/4. The O.D. arc of segments 22 is designated as 22c, the I.D. arc as 22d, and the mid-width arc as 22e.

The radius R of the center-width arcs 22e has been drawn through the ends of the arcs in several places in FIG. 4, one passing through the point P on the tape center line 23a. The radius R forms an angle B with part of the half-width line 23a of the strip or tape. Since the radii R are drawn from centers C1, C2 on the quarter-width lines 23b, it will be obvious that a radius $r$ of small circles drawn from the same centers will touch or be tangent to the side lines of the half-widths. Where the small circles are tangent to the side lines the radii there are perpendicular to the side lines, as known. Radii have been drawn through the common crossing point P; and it will be noted that the radii from the two centers C1 and C2 form a straight line. It is now seen that the angle B lies within a right triangle formed by the side $r$, the hypotenuse R, and a side T which is a part of line 23a. For any desired calculations, then, there is the relationship that $r^2$ plus $T^2$ equals $R^2$.

If now, another tangent line T1 is drawn from point P to a point of tangency with the other side of the small circle at radius $r1$, there will be formed another right triangle with sides $r1$ and T1 and the hypotenuse R. The acute angle B formed will be the same as for the other triangle $r$, T and R. The cutting line 22b defining the ends of the segments will lie on line T1 and the angle A between the cutting line 22b and the tape center line 23a will be equal to two small angles B. If the tangent T1 is laid out as a base line along the left side of the tape from the arc 22e (where crossed by a radius R) to a point of tangency with the small circle, a radius $r1$ will be perpendicular to the base line T1 and the triangle $r1$, T1, R on the side will be identical with the triangle drawn to point P.

Looked at another way, if the end 22a of segment 22.1 at the left edge of the tape with its radius R is turned clockwise until the radius end is at point P, the end 22a will lie along and coincide with end line 22b; likewise, if the end 22a of segment 22.2 with its radius R is turned clockwise about the center C1 until the radius end is at point P, the end 22a will coincide with the end 22b.

As an aid in understanding the situation, the segment 22.2 has been reversed and shown in dotted lines beyond the left side of the tape in FIG. 4 in the position it would occupy in the lay-up of an annular blank.

It has been seen how blank segments can be cut from a tape without scrap which would waste material or foul operating mechanism. In a working operation it is possible to depart slightly from the ideal situation described above and still attain an improved product and procedure.

It will be evident that when segments are cut successively from a tape the O.D. arc of a first-cut segment becomes the I.D. arc of the next-cut segment and so on when working in the direction indicated herein; and it will also be evident that these arcs cannot coincide when they are struck on radii of different lengths. However, within the length of the segments chosen, as compared to the diameter of the annular blank to be formed, this difference is so small that it can be neglected and may even be turned to advantage. Say the O.D. of a first segment becomes the I.D. of the next segment, as illustrated, then the second and all further segments will be very slightly wider at the center than at the ends. This, depending on the basic width of the cut segments, may produce a slight wedging of the segments in the container bucket and aid in keeping the segments in position. The result is that the O.D. of the annular blank will be relatively smooth and the I.D. may be slightly rough; but this is an advantage when gear teeth are cut on the O.D. and the I.D. is united with material forming the inner and hub portions and which does not necessarily have to be of the high quality of the periphery in which gear teeth are cut, the interior roughness aiding in uniting the parts.

Again, the segments have been designed to fit precisely end-to-end to form a complete annulus without gaps. They could be thus laid down by hand perhaps, layer-upon-layer to form an annular blank. However, it is difficult to design a high-speed production machine to give such a precise lay-up without considerable complexity; and actually it has been found that when reasonably thin segments are used, as described above, a very superior product is obtained by overlapping the segments around the annulus even if the mating ends are not placed together, the important consideration apparently being that the segments in multiplicity and overlap provide a uniform amount of base material completely across the width of the annulus. In particular, the material is continuous and even in the outer circumference where gear teeth are to be cut.

The drawings shown the general nature of a machine for making coherent laminated annular blanks from a tape 23 fed from a roll 30. As stated, the tape could be taken directly from the doubling mechanism shown in FIG. 5, if desired, and this has been done successfully.

The mechanism consists essentially of a turntable 35 arranged in cooperative relationship to a high-speed power press 36 and to heating-compressing means 37. The turntable is mounted to swing back and forth about a center journal mount 38 supported in a base pedestal tube 38a so that annular container buckets 39 can be shifted alternately to a position at the press or to a position at the heater-compressing means. A convenient turning means comprises a shaft pinion 40 on the turntable journal and operated reversely as required by a reciprocatory gear rack 41 operated by a reciprocatory piston (not shown) of a power cylinder 42.

Suitable means, such as a slidable detent pin 43 adapted to enter positioning holes in the turntable, are supplied for accurately locking the turntable in proper positions. As shown, the detent pin 43 is actuated by the rack bar.

The buckets 39 are shown of a specific size but mountings 44 are provided which will take buckets of different sizes. Related parts, such as punches, dies, and other elements are also made so they can be changed accordingly.

Provision is made for rotating the buckets while they are located at the press end and at selectable speeds to distribute the segments around the periphery or circumference of the bucket. The turning means includes a shaft 46 driven by an adjustable speed drive unit 47 which is driven positively by a timing belt 48 from the press crank shaft.

The bucket mountings 44 are rotatably mounted on the turntable and have ring gears 49 which mesh with a rotating pinion gear 50 carried by a shaft 50a driven from the shaft 46. The ring gear 49 comes into mesh with the pinion 50 when the turntable is in proper position for segment-forming operations to begin. Special means are provided for securing proper meshing of the ring gears 49 with the pinion 50 without jamming.

Figure 8:
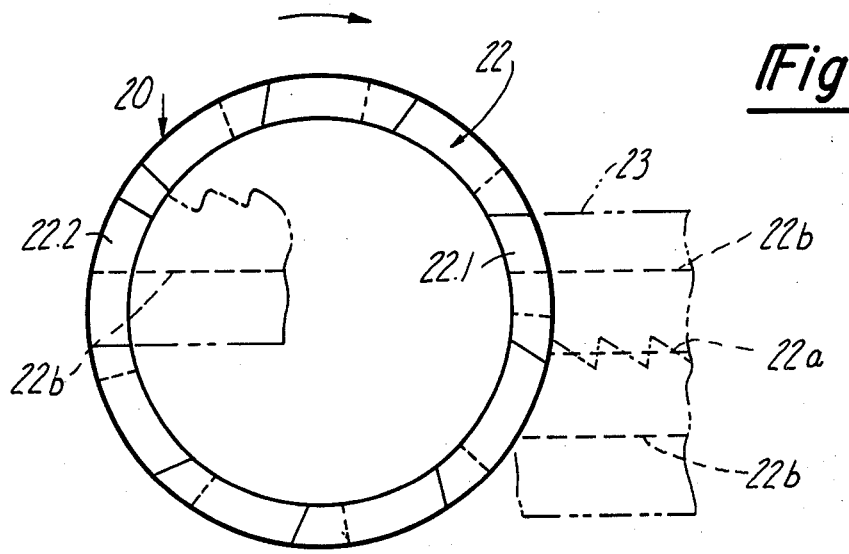
FIG. 8 is a diagrammatic top plan view showing how blank segments are formed and deposited in an annular container or bucket.

An important feature provided by the invention is that of simultaneously cutting two blank segments from a strip as described hereinabove. FIG. 6 shows two punches 51, 52 for cooperating with shaping dies, not shown, to cut segments 22.1, 22.2 respectively, the punches, dies, and segments being centered on the ends of a diameter of the annular blank and buckets which lies along the central line of travel of a portion of the strip being cut. Specifically, as indicated in FIGS. 6 and 8, the tape is fed in along the left line 23b to center the segments 22.1 on the travel diameter to be cut by the first punch 51. The companion reversely disposed segments 22.2 are cut by the punch 52 centered on the other end of the travel diameter. That is, the remaining half-width or remnant side of the tape is fed in along the right hand line 23b on the travel diameter. In order to accomplish this, the remnant half of the tape is moved up, over, and back in a loop 53 in suitable guide means which shift it laterally by the necessary amount by the time its end arrives in position to have a segment cut from it.

On the incoming or forward side the tape is fed while the plunger with punches is retracted by suitable feed means operated by a feed rod 54 from an adjustable eccentric disk 55 of the press shaft which actuates the head carrying the press plunger head and punches. The exact position of the tape as fed in is established by having its end on the incoming side engage an end stop (not shown) above the top opening of the die on that side.

The remnant end coming from the loop is fed in synchronism with the main tape by suitable connected feed means and the exact position is indexed on the side indentations made by the first punch so that the second-cut segment 22.2 will be located precisely under the punch 52 so as to have the cuts register properly with the first cuts. The first punch-die set cuts an arc and an end of segments 22.1; the second punch-die set cuts an arc of segments 22.2.

The punches 51, 52 cooperate with their dies to cut segments and push them through the dies down into the annular space of a bucket. This, per se for a single punch-die set which cuts segments one at a time has been used previously, as noted above. In order to avoid a free fall of the segments an annular false bottom 56 is disposed in the bucket with its lower portions 57 protruding through the spider-like bottom of the bucket, the false bottom 56 being positioned in a top position at the start of the lay-up operation and moved down coordinately with the filling of the bucket as operations proceed. Friction means, described hereinafter, are provided for holding the false bottom in whatever position it is positively moved by other means.

The annular false bottom 56 is lowered as the bucket is filled by a central screw 60 attached to the bottom of a plate 61 secured to the lower end of the false bottom supporting means 57. When the swing of the turntable brings the bucket into loading position the screw 60 is forced between spring-biased swingable split nut members 62 and the turning of the bucket as it is being filled causes the screw and false bottom to be moved down at the proper rate as segments are deposited in the bucket. The screw has a gap 60a at its upper end to avoid jamming and possible damage by continued turning of the bucket after the false bottom has moved down as far as it can go.

When the turntable is shifted with a filled bucket the screw 60 is pushed clear of the split nut members 62, the ring gear 49 is moved clear of the pinion 50, and the bucket is swung to the heating-compressing position.

At the heating-compressing position the annular blank is first pushed up clear of the bucket and heated, as by high-frequency dielectric heating means, until the bonding component material softens to the desired degree; then the heated blank is pushed back down into the bucket and compressed to form a coherent consolidated body; and finally the consolidated annular blank is pushed up sufficiently to clear the top of the turntable for removal, as by being swept off into a chute by a fixed member when the turntable is swung to bring the empty bucket into filling position at the press.

The means for pushing up the false bottom 56 of the bucket to push up the annular blank at the heating-compressing position comprises an annular open-sided spacer 63 adapted to engage the bottom of the plate 61 which supports the false bottom.

The spacer 63 is carried by a support plate 64 attached to the upper end of a push-up plunger 65 operated by a piston in a power cylinder 66. The upward movement of the push-up means is limited by headed stop rods 67 which slide through guides 68 in a fixed part 69 of the base. An electrode 70 is connected to the spacer 63.

The means for engaging the top of a blank comprises a plate or ring 71 carried by insulating spacer means 72 secured to and depending from a support plate 73 carried by a plunger 74 operated by a piston in a power cylinder 75. The cylinder is carried by a frame member 76 secured on a very strong frame pedestal 77. An electrode 78 is connected to the plate 71.

Limit switches and other control elements are shown in the drawings. Their general purpose will be clear from their locations and consideration of the operations described. In general, operations at both ends of the turntable must be completed before the turntable can be swung to a reversed position. A control factor at the filling end may be the number of strokes of the ram carrying the cutting punches. Say there have been 700 strokes or 1400 segments cut and deposited in the bucket, then the press can be stopped and the filled bucket can be moved away when the necessary command is given. A control factor at the other end may be the time or temperature of heating and the time needed for compressing and ejecting a blank. The finish of operations at either end can await the finish of operations at the other end; however, in general, it has been found that operating times can be made almost equal for most blanks. It is preferable to make the heating-compressing operation take less time than the cutting-filling operation in order to get the maximum production.

It is desirable to provide some resistance to the movement of the false bottom so it will remain in any position to which it is moved. When the bucket is being filled the blank segments which are forced down by the punches provide some frictional resistance with the sides of the bucket but additional movement-resistance means are desired to control the position of the false bottom at other times. As shown, the plate 61, which carries the screw 60 and the bucket-supporting means 57, also carries a rod 80 which has its upper end disposed in a guideway or cylinder 81 of the turntable. Expandable friction members 82 (as being spring-pressed apart in pairs) are carried between end-stop elements 83 and 84 provided on the rod, the end-stop elements providing some free movement, as at 85, of the friction members so that when the false bottom is pushed up above the top level of the turntable to eject a consolidated blank it will drop back down to a level slightly below the top level of the turntable after the push-up means has withdrawn, thus to clear the parts at the press when the bucket returns for filling.

Means are provided for holding the turntable in position against vertical displacement by associated power devices. At the press end the base is provided with a pad 86 which will resist any possible harmful downward thrust of the press punches; at the heating-compressing end the base is provided with a bottom pad 87 to resist downward thrusts and an upper pad 88 to resist upward thrusts. There is just enough clearance of the pads by the turntable to permit turning without binding.

The di-electric heating means found effective is in the radio frequency range, say around 27 megacycles; and the time of heating may be controlled by current rise as the blank temperature increases to the point where the bonding material will cause consolidation of the blank laminae when pressed.

The subsequent compression when the blank is returned to the bucket is made sufficient to secure proper consolidation of the blank by the bonding material. Care is taken to keep the heat and pressure in the range of thermo-plasticity of the bonding material and well below the thermo-setting range, that being attained in the final stage of forming the complete item with annulus, disk and hub combined.

The operation of the machine has been explained as the parts have been described. In an operating machine the wide sheet, say 8 inches wide, of single thickness impregnated material (impregnation being best performed on a single thickness), is folded, heated and pressed to cause the layers to stick together whereby to avoid slippage between layers in the punching operation.

The double-thickness strip aids the speed of lay-up, especially with the segments being cut and deposited two at a time, yet the segments are not so thick as to cause gaps if not laid down in end-to-end relationship. An end-overlapping relationship makes a very uniform homogeneous laminated blank assembly.

The basic geometrical lay-out herein disclosed eliminates all drop-off whatever when two reversely arranged segments are cut out across the width of a tape; when a slight departure from the ideal is made for cutting segments successively from a strip, there is still no drop-off or waste whatever; and the accommodation departure from the ideal can actually be turned to advantage, as has been explained.

The action of the machine is very rapid and the press operations coordinate effectively with the heating-compressing operations, especially since the type of heating employed is well-adapted for high-speed operations to keep pace with the cutting and lay-up operations.

While one embodiment of the invention has been described for purposes of illustration, it is to be understood that there may be various embodiments and modifications within the general scope of the invention.

We claim:

1. The method of making annular articles comprising the steps of:
   forming from a strip of material a first plurality of similarly shaped arcuate blank segments,
   forming from said strip of material a second plurality of arcuate blank segments identical in shape to said first plurality of said arcuate blank segments and inverted with respect thereto,
   assembling end to end sequentially one at a time segments from said first plurality of segments and the inverted segments from said second plurality of segments,
   continuing said assembling step until a plurality of layers of said segments are formed to form said annular article,
   the angles of the joining ends of said first and second plurality of segments being at different complementary angles with respect to each other whereby said first and second plurality of segments are formed from said strip material utilizing substantially all the material of said strip of material.

2. The method of making annular articles as set forth in claim 1, further characterized by the fact that said first and second plurality of segments are formed in reverse identical pairs across the width of a parallel-sided strip of material, with the arcs of the segments generated about centers on quarter-width lines of the strip.

3. The method of making annular articles as set forth in claim 2, further characterized by the fact that the center-width arcs of the opposite segments meet at the center of an angular end cutting line between segments, the end cutting line crossing the longitudinal center line of the strip at the point where the mid-width arcs of the segments meet the center line of the strip.

4. The method of making annular articles as set forth in claim 3, further characterized by the fact that the angular end cutting line provides ends of the segments which, in annular assembly, fit with the uncut ends of the segments which are formed from the sides of the strip.

5. The method of making annular articles as set forth in claim 4, further characterized by the fact that said end cutting line makes an angle with the longitudinal center line of the strip, which angle is double the size of the angle formed by the strip center line with a line joining the centers on which the segment arcs are generated.

6. The method of making annular articles as set forth in claim 1, further characterized by the fact that segments are cut from a strip with one arc of the segment fitting one of the O.D. and I.D. arcs of the annular blank article and with the other arc of the segment of the same radius but a different center as the first, the length of the segments being limited to the extent that there is little variation in width of a segment from one end to the other.

7. The method of making annular articles as set forth in claim 6, further characterized by the fact that the segments are cut from a strip with the segment arcs corresponding to the O.D. of the annular blank article to provide a smooth surface at the O.D. of the article and maximum homogeneity near the outer circumference and with a less smooth surface at the I.D. of the article for better integration with interior parts.

8. The method of making annular articles from a parallel-sided strip of material as set forth in claim 1, which comprises, cutting arcuate segments in one arcuate disposition from one side of the strip to form said first plurality of segments, and cutting arcuate segments in a reverse disposition from the other side of the strip to form said second plurality of segments, with the inner ends of opposite segments being cut on a common end line which is inclined at an angle to the center line of the strip.

9. The method of making annular articles as set forth in claim 8, further characterized by the fact that segments from one side of the strip are deposited on one side of the annular article and that segments from the other side of the strip are deposited on the opposite side of the annular article.

10. The method of making annular articles as set forth in claim 9, further characterized by the fact that the reversely disposed segments are deposited simultaneously at opposite sides of the annular article.

11. The method of making annular articles as set forth in claim 10, further characterized by the fact that segments from one side of the strip are cut and deposited by a first punch-die set at an incoming end of a diameter of an annular article, and that reversely disposed segments from the other side of the strip are cut and deposited by a second punch-die set at the outgoing end of a diameter of the annular article.

12. The method of making annular articles as set forth in claim 11, further characterized by the fact that the side of the strip for the reversely disposed segments is fed in a reverse loop from the first punch-die set, both punch-die sets acting simultaneously to form and deposit segments.

13. The method of making annular articles as set forth in claim 11, further characterized by the fact that the first punch-die set cuts and arc and an end of a segment and that the second punch-die set cuts an arc of a segment at a place where the end was cut by the first punch-die set.

* * * * *